United States Patent Office 3,830,715
Patented Aug. 20, 1974

3,830,715
PROCESS FOR THE PREPARATION OF OXYMETHYLENE POLYMERS IN THE PRESENCE OF AN ACYCLIC ACETAL AND A CYCLIC ACETAL
Akihiko Ito, Masaru, Yoshida, and Yoshiaki Nakase, Takasaki, Tadashi Iwai, Kanagawa-ken, Koichiro Hayashi, Sapporo, and Seizo Okamura, Kyoto, Japan, assignors to Japan Atomic Energy Research Institute, Tokyo, Japan
No Drawing. Continuation of abandoned application Ser. No. 23,059, Mar. 26, 1970. This application June 26, 1972, Ser. No. 266,216
Claims priority, application Japan, Mar. 31, 1969, 44/24,563; Dec. 22, 1969, 44/103,270
Int. Cl. B01f 7/16; C08d 1/00; C08f 1/16
U.S. Cl. 204—159.21                    10 Claims

ABSTRACT OF THE DISCLOSURE

Tetraoxane is polymerized in the solid state in the presence of a cyclic acetal and an acyclic acetal in a short time, with high yields and in one step to produce oxymethylene polymers of high thermal stability. The cyclic acetal is 1,3-dioxolane and the acyclic acetal is methylal. The molecular weight of the product polymers can be controlled by varying the amounts of the acetals.

---

This is a continuation of application Ser. No. 23,059, filed Mar. 26, 1970, now abandoned.

SUMMARY OF THE INVENTION

This invention relates to a process for preparing oxymethylene polymers from tetraoxane.

More particularly, the invention relates to a process for obtaining oxymethylene polymers of a high thermal stability by polymerizing tetraoxane in the solid state in the presence of both a cyclic, and an acyclic acetal.

It is well known that formaldehyde, or its cyclic trimer, trioxane, or its cyclic tetramer, tetraoxane is polymerized to obtain polyoxymethylenes having high polymerization degrees. But the thus obtained polymers are poor in chemical and thermal stability and readily depolymerize into formaldehyde. Because of this, they are necessarily subjected to a certain stabilizing treatment prior to application as plastic materials for industrial purposes, such stabilizing treatment being, for example, the acetylation of polyoxymethylene molecular ends with acetic anhydrides (cf. U.S. Pats. 2,964,500 and 2,998,409).

Also known are processes for polymerizing formaldehyde- trioxane, or tetraoxane in the presence of a copolymerizable second component to obtain thermally stable copolymers. One example is the radiation-induced copolymerization of trioxane with cyclic ether, in which copolymers are obtained in the solid state under the in-source polymerization system (cf. S. Rösinger, H. Herman and K. Weissermel, Journal of Polymer Science, A–1 5, 183 (1967)), but both the resulting polymer yields and molecular weight are unsatisfactory, or figurewise 51% at maximum and 0.65 in terms of viscosity $\eta_{sp/c}$, respectively. Moreover, other polymerization conditions are found unpractical. Another example is the solution copolymerization of tetraoxane with cyclic ether (cf. Japanese Pat. 1967/953), in which the product copolymers obtained have the thermal stability somewhat improved but need more stabilizing treatment for practical uses as plastic materials. This prior art procedure does not refer to polymerization in the solid state. One more example is the copolymerization of trioxane with cyclic ether such as ethylene oxide in the presence of a Lewis acid such as $BF_3$ (cf. U.S. Pat. 3,027,352), in which trioxane is in the state of melt or solution. The polymerization system, because of precipitation of the crystalline polymers during the polymerization reaction, changes physically and, as a result, needs complicated handling. When the amount of such precipitating polymers is comparatively large, the polymerization system needs much power for agitation and, for this reason, has to employ complicated equipment and processes as described in the U.S. Pat. 3,254,053.

An object of the present invention is to provide a process, free from the above drawbacks, for preparing oxymethylene polymers having high molecular weight as well as good thermal stability in one step at high polymer yields. This object can be attained by polymerizing tetraoxane in the solid state in the presence of a cyclic acetal and an acyclic acetal.

The invention, which comprises polymerizing tetraoxane in the solid state in the presence of both cyclic and acyclic acetal, is distinct from the above-mentioned prior art, and provides a process for producing commercially useful oxymethylene polymers, under specific advantages, some of which are mentioned as follows:

(1) Thermally stable oxymethylene polymers can be obtained at high yields.

(2) Because the tetraoxane monomer to be used in the solid state polymerization process is often powdery or granular, it can be handled conveniently. That is to say, this monomer, if agitated by a suitable means, can remain powdery or granular throughout the polymerization process; such agitation can be performed with low power; the structure of the polymerization reactor can be simple; and moreover, when additives such as acetal in the liquid state are added to monomer, trioxane monomer particles tend to adhere each other to form a mass, while this tendency is less pronounced with tetraoxane monomer particles.

(3) The polymerization can be carried out economically because no superfluous components are involved in the solid state system.

(4) Polymers of a high molecular weight can be obtained with ease.

(5) More thermally stable polymers can be obtained by adding an acyclic acetal besides the cyclic acetal.

(6) The molecular weights of the polymers obtained can be controlled by increasing or decreasing the dose rate of radiation and/or the amounts of the acyclic acetal to be used.

(7) Contrary to the polymerization of tetraoxane in the liquid state wherein a great amount of trioxane is formed (cf. T. Miki, T. Higashimura and S. Okamura, J. Polymer Sci., A–1, 5, 95 (1967)), resulting in substantially polymerizing a mixture of tetraoxane and trioxane, and therefore requiring a very complicated treatment for the recovery of unreacted monomer, the process according to the present invention need not consider such trioxane formation.

It may be noted from paragraph (7), above that in the polymerization process of the present invention the amounts of trioxane and tetraoxane formed by back biting reaction which usually takes place in the polymerization in the liquid state are negligible. The polymerization mechanism in the solid state according to the invention is essentially different from that of the liquid state polymerization.

Further, in the solid state polymerization trioxane and tetraoxane, which are each a cyclic oligomer of formaldehyde, exhibit clearly different properties, chemical and physical (for instance, in boiling point, melting point, and solubility to solvents) as shown in the examples and controls herein. Trioxane and tetraoxane are different also in respect to adhesiveness to each other of their particles, the difference being significant in the former and less significant in the latter. Moreover, the vapor pressure of tetraoxane is lower, so its handling is easier than that of trioxane.

A cyclic acetal to be used in the polymerization process according to the present invention is represented by the general formula

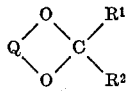

wherein Q is a member selected from the group consisting of a hydrocarbon residue having 2 to 10 carbon atoms and a hydrocarbon residue containing C—O—C linkages and having 2 to 10 carbon atoms, the substituent on the aliphatic hydrocarbon residue, being selected from the group consisting of alkyl, alkenyl, phenyl, and halogens; and $R^1$ and $R^2$ each are members selected from the group consisting of a hydrogen atom or an aliphatic hydrocarbon residue having 1 to 3 carbon atoms. The cyclic acetals may be exemplified by 1,3-dioxolane, 1,3-dioxane, 1,3-dioxepane, 1,3-dioxecane, 1,3,5-trioxepane, 1,3,6-trioxocane, 4-methyl-1,3-dioxolane, 4-phenyl-1,3-dioxane, 5-ethyl - 4 - phenyl - 1,3 - dioxane, 4 - methyl-4-phenyl-1,3-dioxane, 2-methyl-4-methylene-1,3-dioxolane, 1,3-dioxep-5-ene, 1,3-dioxen-6-ene, 5-ethyl-1, 3-dioxep-5-ene, and 2-isopropyl-1,3-dioxep-5-ene.

Next, an acyclic acetal to be used in addition to the cyclic acetal in the process of the present invention is represented by the general formula

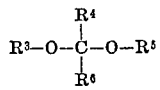

wherein $R^3$ and $R^5$ each are members selected from the group consisting of an aliphatic hydrocarbon residue having 1 to 4 carbon atoms and a substituted aliphatic hydrocabon residue having 1 to 8 carbon atoms, the substitutent being selected from the group consisting of alkyl, alkoxy, and halogens; and $R^4$ and $R^6$ each are members selected from the group consisting of a hydrogen atom and an aliphatic hydrocarbon residue having 1 to 3 carbon atoms. The acetals may be exemplified by dimethoxymethane (methylal),diethoxymethane (ethylal), 1,1-dimethoxyethane, 1,1-diethoxyethane, 1,1-diethoxypropane, dipropoxymethane, dibutoxymethane, methoxybutoxymethane, 1,1-dibutoxypropane, 1,1-diethoxybutane, and 2,2-dimethoxypropane.

Turning now to the preferred embodiment of the invention, it may be described in the following.

First, crystalline tetraoxane is admixed with a cyclic acetal, or preferably with cyclic and acyclic acetals in combination, in amounts of 0.01–15% by weight based on the tetraoxane in the case of cyclic acetal used; and 0.01–10% by weight of the cyclic acetal and $10^{-4}$–5% by weight of the acyclic acetal both based on the tetraoxane in the case of cyclic and acyclic acetals used. Such addition of the acetals may be carried out in the state of liquid drops, mist or gas. A third component such as cyclohexane or benzene may be added at the same time in appropriate amounts in order to mix uniformly the acetals with the tetraoxane, and by so doing a small amount of the acetals, say, less than 1% by weight can be uniformly dispersed in the polymerization system. Another method for achieving a well mixed system is to melt the mixture by heating it to above the melting point of tetraoxane. There is no specific length of time for the mixture to be allowed to stand. It should be noted that the addition of cyclic and acyclic acetals is made, irrespective of the order.

The polymerization reaction then is induced by conventional methods, e.g., in the presence of an initiator or by subjecting to ionizing radiation, or by means of both of them. The polymerization initiators may be exemplified by Lewis acids, organic co-ordination complexes thereof, Bronsted acids, and hydrocarbon halides. The Lewis acids include boron trifluoride, tin tetrachloride, aluminum chloride, and titanium tetrachloride; the organic co-ordination complexes of Lewis acids include boron trifluoride etherate, tin tetrachloride-trichloroacetic acid complex, and tin tetrachloride-water complex; the Broensted acids include hydrochloric acid, hydrobromic acid, hydriodic acid, sulfuric acid, and trichloroacetic acid; and the hydrocarbon halides are, for example, methylene chloride, chloroform, bromoform, methyl iodine, and ethyl iodide, having the general formula $$RX_n$$

wherein R is an aliphatic hydrocarbon residue, X is a halogen, and $n$ is a positive integer. The hydrocarbon halides are advantageously employed as polymerization initiators, since they themselves are substantially neutral and, therefore, the neutralization treatment of the polymerization product is unnecessary. It is also noted that the stability of polymers obtained by using the hydrocarbon halide as an initiator is higher than that of polymers obtained by using any other initiator.

As polymerization initiators, Lewis acids, organic complex compounds, and Broensted acids each may be used in the amount of $10^{-4}$–10% by weight of the tetraoxane, and hydrocarbon halides in the amount of $10^{-6}$–10% by weight also of the tetraoxane. As ionizing radiation, $\alpha$-rays, $\beta$-rays, $\gamma$-rays, electron beams, X-rays, beams of neutron, and heavy particles may be employed either individually or in combination, in the dose range of $10^2$–$10^9$ rad both in the in-source polymerization and post-polymerization, or at dose rates of $10^2$–$10^9$ rad/hour in the in-source polymerization.

The polymerization processes according to this invention will now be described.

The initiator-using polymerization is carried out by adding the initiator and acetal to tetraoxane in the manners and amounts as described above, and keeping its system at temperatures of 70–112° C., the polymerization being complete in several minutes or hours. It should be noted that polymerization may proceed before the tetraoxane melts in a bath kept above its melting point.

In the post-polymerization the system in which tetraoxane has been admixed with or without the acetal is irradiated at the dosage as specified above and thereafter treated alike the initiator-using process to polymerize in the presence of the acetal. The temperature at which radiation should be applied is below the melting point of tetraoxane, 112° C., but it is conveniently at room temperature. When irradiation is applied at high temperatures (above 70° C.), it will cause the in-source polymerization simultaneously. In the in-source polymerization, the system including tetraoxane added with the acetal is heated to temperatures of 70–112° C. and then subjected to ionizing radiation of the type and at the dosage as specified above. Irradiation time is limited so that the irradiation dose is in the range of $10^2$–$10^9$ rad.

Another polymerization process is to apply irradiation to its system in the presence of a hydrocarbon halide used as an initiator. Amounts of hydrocarbon halide to be used are between $10^{-6}$ and 5% by weight of the tetraoxane in either case of the in-source or post-polymerization. It should be noted that in the case of post-polymerization the addition of the hydrocarbon halide as well as the acetal is done, before or after irradiation.

Any of the above-mentioned polymerization processes may be practised either in vacuum, in air, or in inert gas. It is advantageous, however, to keep the system in vacuum in order to disperse the additive such as initiator or acetal readily. Further, when there are possibilities for the additives to be lost during polymerization, it is preferable to have the system closed.

An oxymethylene polymer, to wit, the intended product of this invention, is obtained as a white crystalline material, having a superior thermal stability, by washing the polymerization product with an effective solvent such as acetone, benzene and methanol and thereby removing unreacted tetraoxane and additives.

As has been described in the foregoing, the present invention aims at preparing oxymethylene polymers of high thermal stability by polymerizing tetraoxane in the presence of a cyclic acetal, such thermal stability being more efficiently improved by synergism when cyclic and acyclic acetals are employed instead of the cyclic acetal alone. In the oxymethylene polymer obtained by polymerization in the presence of a cyclic acetal, its mechanical strength will be lower and its thermal stability rise as the amount of the cyclic acetal used increases. If an acyclic acetal is additionally used in proper amounts, it serves to check such lowering of mechanical strength and, at the same time, improve the thermal stability. Further, the molecular weight of the product polymer can be controlled by varying the amounts of the acyclic acetal used.

The invention is further illustrated but not limited by the following examples, in which the intrinsic viscosity number $[\eta]$ of the oxymethylene polymer is determined at 60° C. as a 0.5% solution of parachlorophenol containing 2% of α-pinene; the average thermal decomposition rate, $K_{222}$ in terms of percent/min., is measured in nitrogen stream at 222° C. for one hour, to show the thermal stability of the polymer; and the amount of each additive used (e.g., cyclic acetal, acyclic acetal and polymerization initiator) is presented in percent by weight based on the tetraoxane.

EXAMPLE 1

To 1 g. of tetraoxane, purified by sublimation, was added 3.0% of 1,3-dioxolane in a glass ampoule. Then, the glass ampoule was sealed. The mixture, after being allowed to stand at room temperature for 20 hours under vacuum, was irradiated with γ-rays at the dose rate of $1 \times 10^5$ rad/hr. for 1 hour in a thermostat at 100° C. The resultant product was then subjected to treatment to remove unreacted tetraoxane and 1,3-dioxolane by washing with acetone and to allow it to dry at room temperature, and thus was obtained a white polymer having the $[\eta]$ of 2.5 and the $K_{222}$ of 0.40. The yield of the polymer was 80%.

EXAMPLE 2

To 1 g. of tetraoxane, purified by sublimation, was added 5.0% of 1,3-dioxolane. The mixture, after being irradiated with γ-rays at the dose of $1 \times 10^6$ rad at room temperature, was allowed to stand for 20 hours, and then subjected to post-polymerization for 4 hours in a bath kept at 105° C.

The resultant product was treated similarly to Example 1, to obtain a white polymer having the $[\eta]$ of 1.2 and the $K_{222}$ of 0.90 at the yield of 20%.

EXAMPLES 3–5

To 1 g. of tetraoxane, purified by sublimation, were added 3.0% of 1,3-dioxolane and one of the different polymerization initiators as indicated in the following table. Each mixture, after being allowed to stand for 10 hours at room temperature, was subjected to polymerization for 1 hour in a bath kept at 105° C.

The resultant products were neutralized by adding triethylamine, and then treated similarly to Example 1, to obtain white polymers. The following table shows their yields and physical properties.

| | Polymerization initiator | Amount used (percent) | Polymer yield (percent) | $[\eta]$ | $K_{222}$ |
|---|---|---|---|---|---|
| Example number: | | | | | |
| 3 | HCl | 2.0 | 93 | 0.5 | 0.78 |
| 4 | $BF_3 \cdot O(C_2H_5)_2$ | 2.0 | 82 | 1.2 | 0.50 |
| 5 | $SnCl_4$ | 2.0 | 83 | 0.7 | 0.62 |

EXAMPLES 6–19

To 1 g. of tetraoxane, purified by sublimation, were added each one of the different kinds of the cyclic acetals and hydrocarbon halides as indicated in the following table. Each mixture, after being allowed to stand for 20–70 hours at room temperature, was subjected to polymerization in a hot bath.

The resultant products were treated similarly to Example 1, to obtain white polymers. The table gives the conditions and results of the polymerization.

For control, similar experiments were conducted, one in the liquid state, the other in the solid state without cyclic acetal, results of which are given in the same table.

| | Polymerizing conditions | | | | | | | | |
|---|---|---|---|---|---|---|---|---|---|
| | Cyclic acetal | | Hydrocarbon halide | | | Bath | | | |
| | Compound | Amount used (percent) | Compound | Amount used (percent) | Hours allowed to stand | temperature (° C.) | Polymerization time (hrs.) | Polymer yield (percent) | $[\eta]$ | $K_{22}$ |
| Example number: | | | | | | | | | | |
| 6 | 1,3,6-trioxocane | 5.0 | Methyliodide | 4.0 | 3 | 105 | 1 | 98 | 2.2 | 0.08 |
| 7 | 1,3-dioxolane | 3.0 | do | 1.0 | 24 | 105 | 2 | 90 | 2.9 | 0.15 |
| 8 | do | 5.0 | do | 3.0 | 24 | 105 | 2 | 90 | 1.8 | 0.10 |
| 9 | do | 9.0 | do | 3.0 | 24 | 105 | 2 | 86 | 1.1 | 0.10 |
| 10 | do | 3.0 | do | 11.0 | 24 | 105 | 2 | 96 | 1.3 | 0.90 |
| 11 | do | 5.0 | do | 4.0 | 30 | 105 | 0.7 | 80 | 1.6 | 0.15 |
| 12 | do | 5.0 | do | 4.0 | 30 | 105 | 2 | 93 | 1.6 | 0.18 |
| 13 | do | 5.0 | do | 4.0 | 70 | 90 | 1 | 40 | 1.6 | 0.07 |
| 14 | do | 5.0 | do | 4.0 | 70 | 115 | 1 | 88 | 2.6 | 0.08 |
| 15 | do | 5.0 | Ethyliodide | 4.0 | 24 | 105 | 2 | 94 | 1.8 | 0.13 |
| 16 | do | 5.0 | Methylenechloride | 3.0 | 24 | 105 | 2 | 99 | 1.4 | 0.50 |
| 17 | 1,3-dioxane | 3.0 | Methyliodide | 4.0 | 24 | 105 | 2 | 79 | 3.0 | 0.80 |
| 18 | do | 5.0 | do | 4.0 | 24 | 105 | 2 | 83 | 2.0 | 0.65 |
| 19 | 1,3-dioxolane | 5.0 | {Methyliodide / Methylenechloride} | {2.0 / 1.0} | 20 | 105 | 1 | 100 | 2.4 | 0.13 |
| Control | do | 3.0 | Methyliodide | 4.0 | 10 | 120 | 0.3 | 71 | 0.8 | 0.53 |
| Do | | | do | 3.0 | 24 | 105 | 2 | 93 | 3.7 | 1.3 |

EXAMPLE 20

To 1 g. of tetraoxane, purified by sublimation, were added 5.0% of 1,3-dioxolane and 0.01% of ethyliodide. The mixture, after being allowed to stand for 5 hours at room temperature, was irradiated with γ-rays at the dose rate of $1 \times 10^5$ rad/hr. for one hour in a thermostat at 105° C.

The resultant product was treated similarly to Example 1, to obtain a white polymer having the $[\eta]$ of 0.7 and the $K_{222}$ of 0.63 at the yield of 93%.

EXAMPLES 21–22

To 2 g. of tetraoxane, purified by sublimation, were added 1,3-dioxolane and methyliodide in varied amounts as indicated in the following table. Each mixture, after being irradiated with γ-rays, was allowed to stand for 20 hours at room temperature, and then subjected to post-polymerization.

The resultant products were treated similarly to Example 1.

Further as control, similar experiments were conducted, with no irradiation.

The results of these experiments are given in the following table.

in obtaining a polymer having $[\eta]$ and $K_{222}$ of 2.5 and 0.43, respectively, at the polymer yield of 90%, while the latter obtaining a polymer having $[\eta]$ and $K_{222}$ of 2.0 and 0.38, respectively, at the yield of 92%.

| | Polymerization conditions | | | | | | | |
|---|---|---|---|---|---|---|---|---|
| | Amount of 1,3-dioxolane added (percent) | Amount of methyl-iodide added (percent) | Radiation dose (rad) | Bath temperature (° C.) | Polymerization time (hr.) | Polymer yield (percent) | $(\eta)$ | $K_{222}$ |
| Example number: | | | | | | | | |
| 21 | 5.0 | 0.4 | 1×10⁵ | 105 | 1 | 65 | 1.9 | 0.11 |
| 22 | 5.0 | 1.0 | 1×10⁵ | 105 | 1 | 82 | 2.7 | 0.11 |
| Control: | | | | | | | | |
| 21' | 5.0 | 0.4 | Nil | 105 | 1 | 58 | 1.2 | 0.70 |
| 22' | 5.0 | 1.0 | Nil | 105 | 1 | 70 | 2.0 | 0.40 |

EXAMPLE 23

To 2 g. of tetraoxane, purified by sublimation, were added 2.0% of 1,3-dioxolane and 1.0% of methylal. The mixture, after being allowed to stand for 3 hours at room temperature, was irradiated with γ-rays at the dose rate of 1×10⁵ rad/hr. for 1 hour in a thermostat at 105° C.

The resultant product was treated similarly to Example 1, to obtain a white polymer having the $[\eta]$ of 0.6 and the $K_{222}$ of 0.38 at the yield of 77%.

Control

To 1 g. of trioxane, purified by sublimation, were added 1,3-dioxolane and methylal in same amounts as in Example 23. The mixture was then subjected to irradiation with γ-rays at the dose rate of 1×10⁵ rad/hr. for 1 hour in a thermostat at 55° C. The thus obtained polymer had its $[\eta]$ of 0.2 and $K_{222}$ of 0.58. The polymer yield was 8%.

EXAMPLE 24

To 1 g. of tetraoxane, purified by sublimation, were added 4.0% of 1,3-dioxolane and 1.0% of methylal. The mixture, after being subjected to irradiation with γ-rays at the dose of 1×10⁵ rad, was allowed to polymerize in a bath at 105° C. Treatment similar to the one described in Example 1 was conducted, to obtain a white polymer having the $[\eta]$ of 1.2 and the $K_{222}$ of 0.12 at the yield of 60%.

EXAMPLES 25–27

To 1 g. of tetraoxane, purified by sublimation, were added 2.0% of 1,3-dioxolane and 1.0% of methylal, and then one of the different initiators as indicated in the following table. Each mixture was allowed to polymerize for one hour in a bath at 105° C.

The resultant products were treated similarly to Examples 3–5, to obtain white polymers. Results are shown in the table.

| | Polymerization initiator | Amount of addition (percent) | Polymer yields (percent) | $[\eta]$ | $K_{222}$ |
|---|---|---|---|---|---|
| Example number: | | | | | |
| 25 | HCl | 2.0 | 97 | 0.4 | 0.40 |
| 26 | BF₃·O(C₂H₅)₂ | 2.0 | 80 | 1.0 | 0.22 |
| 27 | SnCl₄ | 2.0 | 81 | 0.6 | 0.41 |

EXAMPLE 28

To 1 g. of tetraoxane, purified by sublimation, were added 2.0% of 1,3-dioxolane and 1.0% of methylal, and then 4.0% of methyliodide as a polymerization initiator. The mixture was allowed to polymerize for one hour in a bath at 105° C.

The resultant product was treated similarly to Example 1, to obtain a white polymer having the $[\eta]$ of 1.1 and the $K_{222}$ of 0.05 at the yield of 93%.

As control, two similar experiments were conducted, one with 2.0%, the other with 3.0% of 1,3-dioxolane and both with no methylal added. The former resulted

EXAMPLE 29

To 1 g. of tetraoxane, purified by sublimation, were added 2.5% of 1,3-dioxolane and varied amounts between 0.1 and 2.5% of methylal, and then 2.0% of methyl iodide as a polymerization initiator. Each mixture was allowed to polymerize for 1 hour in a bath at 105° C.

The resultant products were treated similarly to Example 1, to obtain white polymers, with results given in the following table.

| Amount of methylal added (percent) | Polymer yield (percent) | $[\eta]$ | $K_{222}$ |
|---|---|---|---|
| 0.1 | 90 | 2.1 | 0.10 |
| 0.5 | 91 | 1.5 | 0.09 |
| 1.0 | 91 | 1.0 | 0.05 |
| 2.5 | 93 | 0.3 | 0.05 |

EXAMPLE 30

To 1 g. of tetraoxane, purified by sublimation, were added 4.5% of 1,3-dioxolane and 0.5% of methylal, and then 2.0% of methyliodide as a polymerization initiator. The mixture was allowed to polymerize for 1 hour in each bath kept at 90° C. and 105° C.

The resultant products were treated similarly to Example 1, obtaining the results given in the following table.

Further as control, similar experiments were conducted at 120 C. and 130° C. both in the liquid state. Its results are also given in the table.

| Example number | Polymerization temperature (° C.) | State | Polymer yield (percent) | $[\eta]$ | $K_{222}$ |
|---|---|---|---|---|---|
| 30 | 90 | Solid | 35 | 1.3 | 0.05 |
|  | 105 | do | 95 | 2.0 | 0.06 |
| Control | 120 | Liquid | 90 | 1.0 | 0.30 |
|  | 130 | do | 95 | 0.8 | 0.33 |

EXAMPLE 31

To 1 g. of tetraoxane, purified by sublimation, were added 2.0% of 1,3-dioxolane and 1.0% of methylal, and then 0.1% of ethyliodide as a polymerization initiator. The mixture was subjected to irradiation with γ-rays at the dose rate of 1×10⁵ rad/hr. for 1 hour at 100° C., to polymerize.

The resultant product was treated similarly to Example 1, obtaining the yield, $[\eta]$ and $K_{222}$ of 87%, 1.5 and 0.5, respectively.

EXAMPLE 32

To 1 g. of tetraoxane, purified by sublimation, were added 4.0% of 1,3-dioxolane and 1.0% of methylal, and then 0.2% of methyliodide. The mixture, after being subjected to irradiation with γ-rays at the dose of 1×10⁵ rad, was allowed to polymerize for 1 hour at 105° C.

The resultant product was treated as in Example 1, to obtain a white polymer having the $[\eta]$ of 1.0 and the $K_{222}$ of 0.10 at the yield of 85%.

What is claimed is:

1. A process for preparing oxymethylene polymers, which comprises polymerizing tetraoxane in the solid state in the presence of a cyclic acetal and an acyclic acetal, so as to form oxymethylene polymers, said cyclic acetal being from 0.01 to 10% by weight of 1,3-dioxolane, calculated on the amount of tetraoxane and said acyclic acetal being from $10^{-4}$ to 5% by weight of methylall, calculated on the amount of tetraoxane.

2. The process according to Claim 1, wherein said polymerization of tetraoxane is induced by ionizing radiation.

3. The process according to Claim 2, wherein the tetraoxane is polymerized by subjecting the same to ionizing radiation at a dose rate of from $10^2$ to $10^9$ rad/hour at a temperature of from 70 to 112° C.

4. The process according to Claim 2, wherein the tetraoxane is polymerized at a temperature of from 80 to 112° C. after being subjected to ionizing radiation of from $10^2$ to $10^9$ rad.

5. The process according to Claim 1, wherein said polymerization of tetraoxane is carried out by means of a polymerization initiator at a temperature of from 70 to 112° C.

6. The process according to Claim 5, wherein said polymerization initiator is a member selected from the group consisting of Lewis acid, organic co-ordination complex thereof and Broensted acid and used in amounts of from $10^{-4}$ to 10% by weight of the tetraoxane.

7. The process according to Claim 5, wherein said polymerization initiator is a hydrocarbon halide used in amounts of from $10^{-6}$ to 10% by weight of the tetraoxane.

8. The process according to Claim 1, wherein said polymerization of tetraoxane is induced by both ionizing radiation and polymerization initiator.

9. The process according to Claim 8, wherein said tetraoxane is polymerized in the presence of a hydrocarbon halide as polymerization initiator in amounts of from $10^{-6}$ to 5% by weight of the tetraoxane by subjecting the same to ionizing radiation at a dose rate of from $10^2$ to $10^9$ rad/hour at a temperature of from 70 to 112° C.

10. The process according to Claim 8, wherein said tetraoxane is polymerized in the presence of a hydrocarbon halide as polymerization initiator in amounts of from $10^{-6}$ to 5% by weight of the tetraoxane at a temperature of from 80 to 112° C. after being subjected to ionizing radiation of from $10^2$ to $10^9$ rad.

References Cited

UNITED STATES PATENTS

| | | | |
|---|---|---|---|
| 3,346,663 | 10/1967 | Kern et al. | 260—67 FP |
| 3,457,226 | 7/1969 | Miyake et al. | 260—67 FP |

OTHER REFERENCES

Free-Radical Induces Cationic Polymerization, C. & E. News, Sept. 6, 1965, pp. 40–41.

Hayashi et al.: Structure of Polymers Formed by Radiation-Induced Solid-Phase Polymerization of Cyclic Manners, J. of Polymer Science, part C, No. 4, pp. 839–848.

MURRAY TILLMAN, Primary Examiner

R. B. TURER, Assistant Examiner

U.S. Cl. X.R.

260—67 FP, R

UNITED STATES PATENT OFFICE
CERTIFICATE OF CORRECTION

Patent No. 3,830,715　　　　　　　　　Dated August 20, 1974

Inventor(s) Akihiko Ito et al.

It is certified that error appears in the above-identified patent and that said Letters Patent are hereby corrected as shown below:

The term of this patent subsequent to July 18, 1989, has been disclaimed.

Signed and Sealed this

Twenty-seventh Day of July 1976

[SEAL]

Attest:

RUTH C. MASON
*Attesting Officer*

C. MARSHALL DANN
*Commissioner of Patents and Trademarks*